(12) United States Patent
Mueller

(10) Patent No.: US 7,264,180 B2
(45) Date of Patent: Sep. 4, 2007

(54) AERATOR SLEEVE ATTACHMENT

(75) Inventor: John R. Mueller, Wauwatosa, WI (US)

(73) Assignee: Idea Factory, Inc., Menomonee Falls, WI (US)

( * ) Notice: Subject to any disclaimer, the term of this patent is extended or adjusted under 35 U.S.C. 154(b) by 0 days.

(21) Appl. No.: 11/244,754

(22) Filed: Oct. 6, 2005

(65) Prior Publication Data

US 2007/0080241 A1    Apr. 12, 2007

(51) Int. Cl.
 *E03C 1/08* (2006.01)
(52) U.S. Cl. .................. 239/428.5; 239/397; 239/575; 239/588; 239/590.3; 239/600; 239/DIG. 23
(58) Field of Classification Search ............. 239/428.5, 239/432, 390, 397, DIG. 23, 407, 588, 600, 239/553.3, 553.5, 590.3, 590.5, 575
See application file for complete search history.

(56) References Cited

U.S. PATENT DOCUMENTS

| | | | | |
|---|---|---|---|---|
| 2,816,746 | A * | 12/1957 | Botnick ................... | 239/428.5 |
| 3,110,445 | A * | 11/1963 | Benjamin et al. ........ | 239/590.3 |
| 3,796,377 | A * | 3/1974 | O'Hare .................... | 239/590.3 |
| 3,799,450 | A * | 3/1974 | Braukman ............... | 239/428.5 |
| 4,530,467 | A * | 7/1985 | Bueno ........................ | 239/407 |
| 4,534,513 | A * | 8/1985 | Aghnides ................. | 239/428.5 |
| 4,562,960 | A * | 1/1986 | Marty et al. .................. | 239/72 |
| 5,071,071 | A * | 12/1991 | Chao ....................... | 239/428.5 |
| 5,114,072 | A * | 5/1992 | Barhydt, Sr. ............. | 239/428.5 |
| 5,348,231 | A * | 9/1994 | Arnold et al. ........... | 239/428.5 |
| 5,467,929 | A * | 11/1995 | Bosio ...................... | 239/428.5 |
| 5,769,326 | A * | 6/1998 | Muchenberger et al. . | 239/428.5 |
| 5,803,368 | A * | 9/1998 | Shekalim ................. | 239/428.5 |
| 6,029,912 | A * | 2/2000 | Woolley .................. | 239/428.5 |
| 6,513,731 | B2 * | 2/2003 | Griffin et al. ............... | 239/394 |
| 6,971,591 | B2 * | 12/2005 | Fleischmann ............ | 239/428.5 |

\* cited by examiner

*Primary Examiner*—Steven J. Ganey
(74) *Attorney, Agent, or Firm*—Joseph S. Heino; Patrick M. Bergin

(57) ABSTRACT

The present invention provides for a sleeve that screws into the same opening in a faucet that a typical aerator screws into. This sleeve replaces the aerator and includes a smaller aerator that is inserted within the sleeve. In this fashion, water aeration can still occur when aeration is desired. However, when a hose attachment is inserted into the sleeve, one of the hose attachment moves up and into the sleeve.

8 Claims, 5 Drawing Sheets

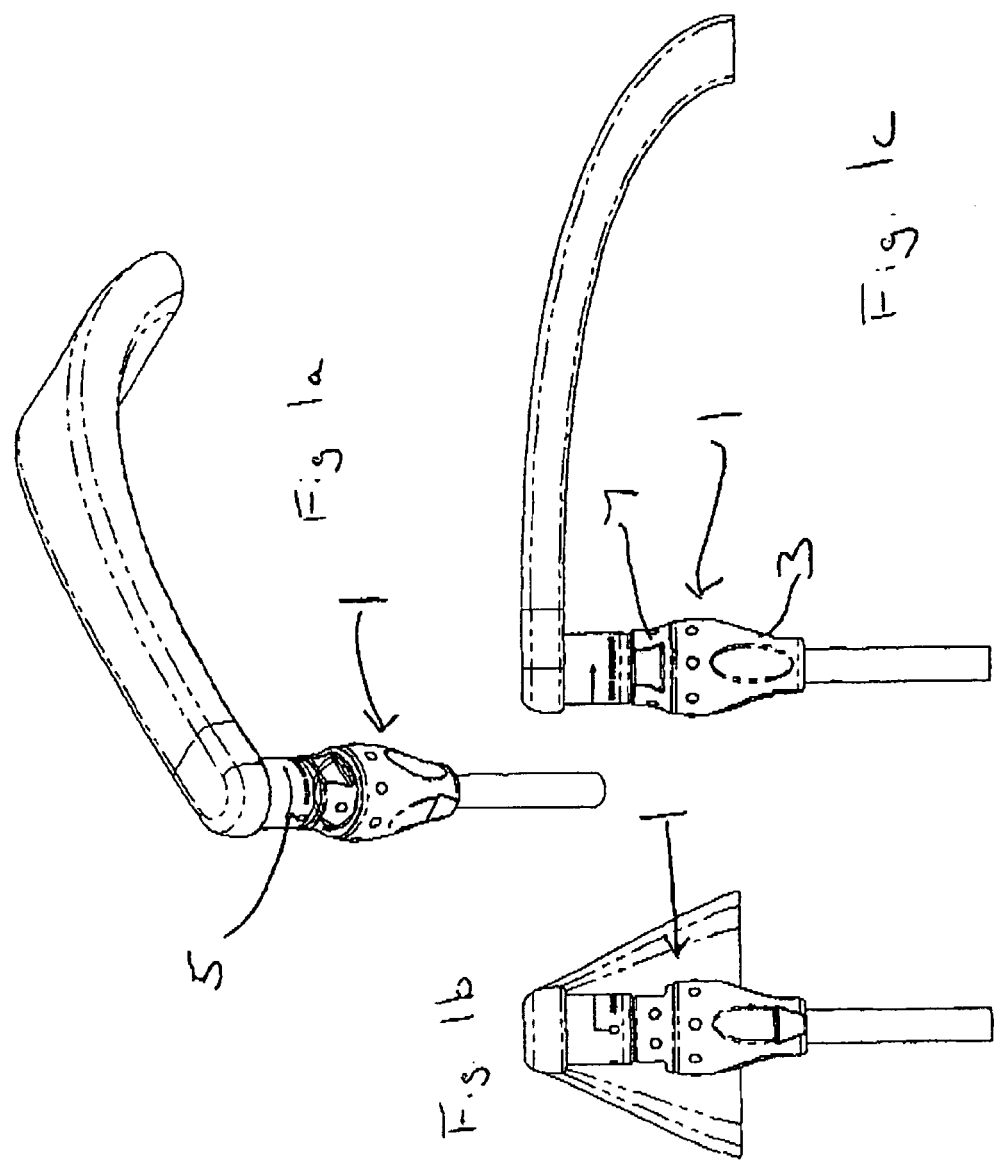

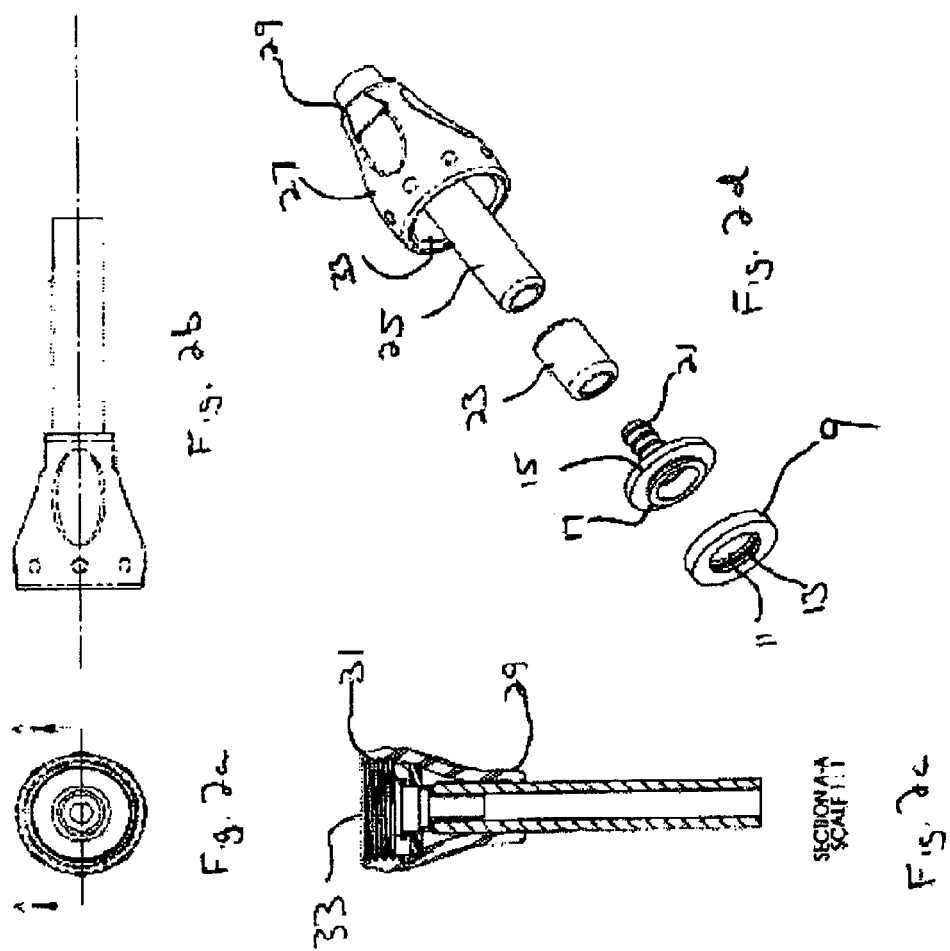

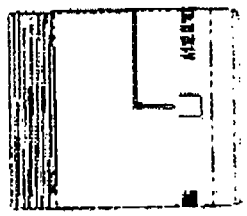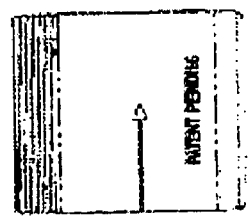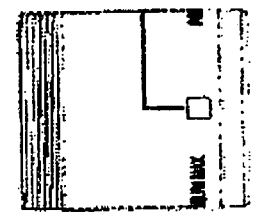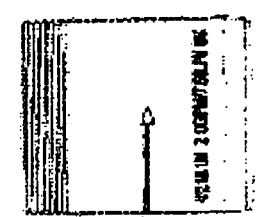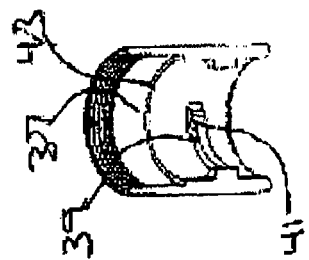
Fig 5b
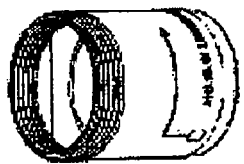
Fig 5a
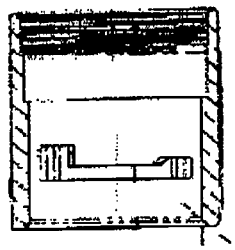
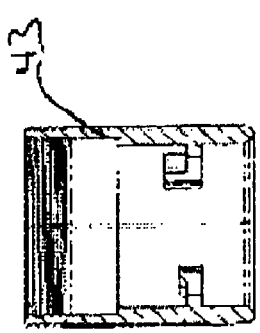
Fig 5d
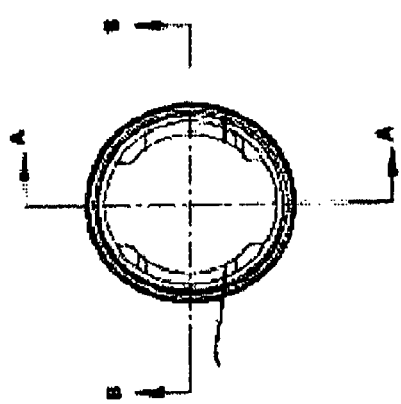

AERATOR SLEEVE ATTACHMENT

BACKGROUND OF THE INVENTION

The present invention is, in general, related to detachable hose assemblies for use with existing faucets. More specifically, the present invention relates to a device for coupling a hose to a faucet that provides for a bypassable aerator.

Most faucets employ an aerator for mixing air and water coming out of the faucet to provide a softer stream of water. Aerators also reduce splashing of the water when the water coming out of the faucet comes into contact with, for example, the bottom of a sink. In most aerators of current manufacture, the aerator screws into the delivery end of the spout. The aerator has small openings about its perimeter which, based on the Venturi principle, draw air into the water that flows through the aerator. The water thus delivered has small air bubbles contained within it. While the presence of the air bubbles is usually desired, there are some situations where it is also desirable to stop this aeration of the flowing water.

Occasionally, however, there is a need for cleaning something that may not fit underneath a particular faucet or it may be extremely inconvenient to maneuver an object, such as a large pot, underneath the faucet. Pets are also difficult to coax underneath a faucet. Many sinks provide a hose attachment to use in combination with a standard faucet. However, these types of sinks are generally confined to use in kitchens.

Therefore, what is needed is a device that can be attached to any faucet and that provides for the use of a hose and sprayer in conjunction therewith. While it would seem that one might simply provide a faucet having some attachment means for connecting a hose and sprayer assembly, the presence of an aerator in the faucet causes bubble formation within the hose and sprayer assembly, which interrupts water flow. Therefore, what is also needed is a coupling for a hose and sprayer to a faucet that does not require removal of the aerator within the faucet.

SUMMARY OF THE INVENTION

The present invention provides for a sleeve that screws into the same opening in a faucet that a typical aerator screws into. This sleeve replaces the aerator and includes a smaller aerator that is inserted within the sleeve. In this fashion, water aeration can still occur when aeration is desired. However, when a hose attachment is inserted into the sleeve, one end of the hose attachment moves up and into the sleeve. The hose attachment end additionally has arms that extend up and into the sleeve. Each arm has a small "L-shaped" hook defined at its distal end. Each hook points in the same circular direction and these hooks are used to engage aeration openings defined within the small aerator when the attachment is rotated within the sleeve. The attachment includes a seal or o-ring that contacts the inner surface of the sleeve. When fully engaged, the attachment end effectively blocks the flow of air into the sleeve, thereby preventing aeration. The foregoing and other features of the device of the present invention will be apparent from the detailed description that follows.

BRIEF DESCRIPTION OF THE DRAWINGS

FIG. 1a shows a front and side perspective view of the device of the present invention shown attached to a faucet.

FIG. 1b shows a front elevational view of the aerator sleeve attachment.

FIG. 1c shows a side elevational view of the aerator sleeve attachment.

FIG. 2a shows top elevational view of female hose assembly of the device of the present inventor.

FIG. 2b shows a side elevational view of the female hose assembly.

FIG. 2c shows a side elevational cutaway view taken along line A-A in FIG. 2a of the female hose assembly.

FIG. 2d shows an exploded view of the female hose assembly.

FIG. 5a is a top and side perspective view of the faucet connector.

FIG. 5b is a top and side perspective cutaway view of the faucet connector of the aerator assembly of the present invention.

FIG. 5c is a side cutaway view of the faucet connector shown in FIG. 5a.

DETAILED DESCRIPTION

Figure 3D:
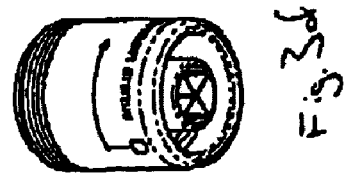
FIG. 3d shows a side and bottom perspective view of the aerator assembly.

Now referring to the drawings in detail wherein like reference numbers refer to like elements through, FIG. 1 shows the aerator sleeve attachment 1 as installed on a faucet. In general, the aerator sleeve attachment 1 is comprised of three larger parts, the female hose assembly 3, the aerator assembly 5 and the hose connector 7.

In more detail, the female hose assembly is comprised of a seal ring 9, the seal ring 9 having a center aperture 11. The seal ring 9 additionally features a central groove 13. The central groove 13 of the seal ring 9 fits over the retaining lip 17 of the hose barb 15 such that the seal ring 9 seals against the seal rim 19 of the hose barb 15. The hose barb 15 also features a plurality of ridges 21. The ridges 21 of the hose barb snap 15 into a hose ferrule 23.

The hose ferrule 23 is capped around a length of tubing 25. A handle 27 fits snugly over the tubing 25 at one end 29 but widens considerably at the other end 33 to admit the hose barb 15, seal ring 9, and ferrule 23. In fact, the hose barb 15, seal ring 9, and ferrule 23 are accommodated within the handle 27, which is also internally threaded 31 at its wider end 33.

In more detail, the female hose assembly 3 is assembled by sliding the handle 27 on to the tubing 25. Next the seal ring 9 is installed on the seal rim 19 of the hose barb 15. Third, the hose barb 15 is inserted into the ferrule 23 until the ferrule 23 snaps onto the hose barb 15. Next, the ferrule 23 is clamped onto the end of the tubing 25 and the handle 27 slides over the other parts to complete the female hose assembly 3.

Figure 3C:
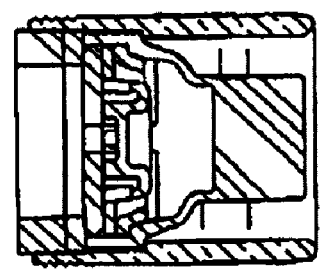
FIG. 3c shows a side elevational cutaway view of the aerator assembly along line C-C of FIG. 3b.
Figure 3A:
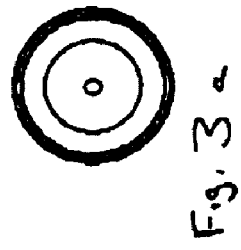
FIG. 3a shows a top elevational view of the flow restrictor disk.
Figure 3B:
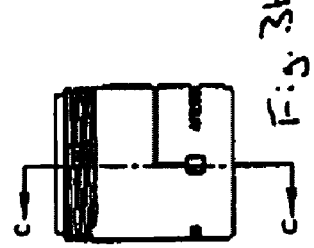
FIG. 3b shows a side elevational view of faucet connector.
Figure 3E:
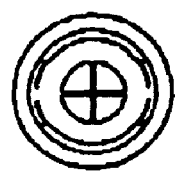
FIG. 3e shows a bottom plan view of the stream straightener.
Figure 3F:
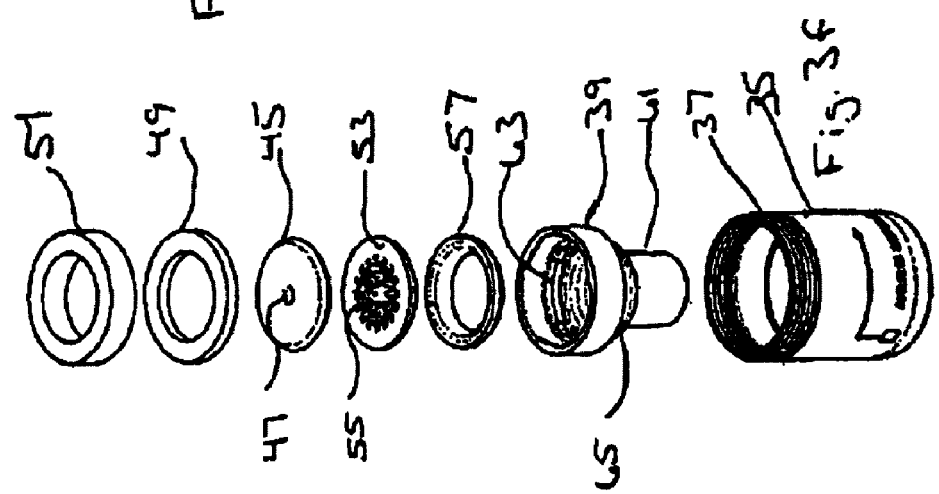
FIG. 3f shows an exploded view of the aerator assembly.
Figure 4B:
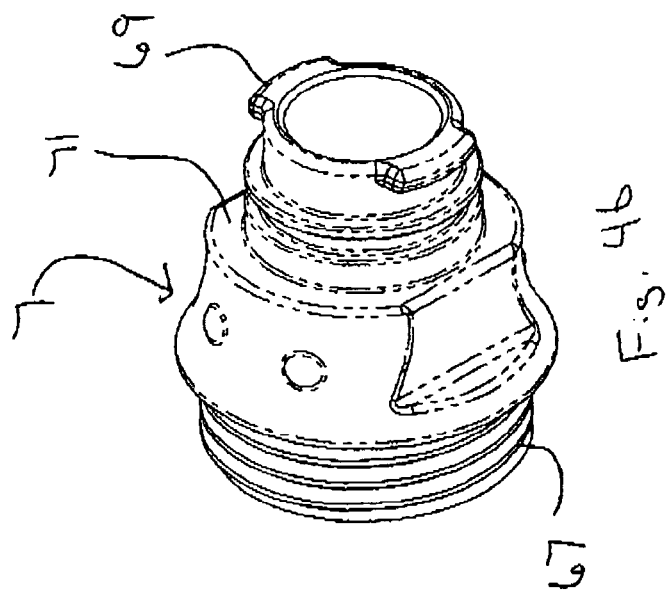
FIG. 4b is a side and top perspective view of the hose connector.
Figure 4A:
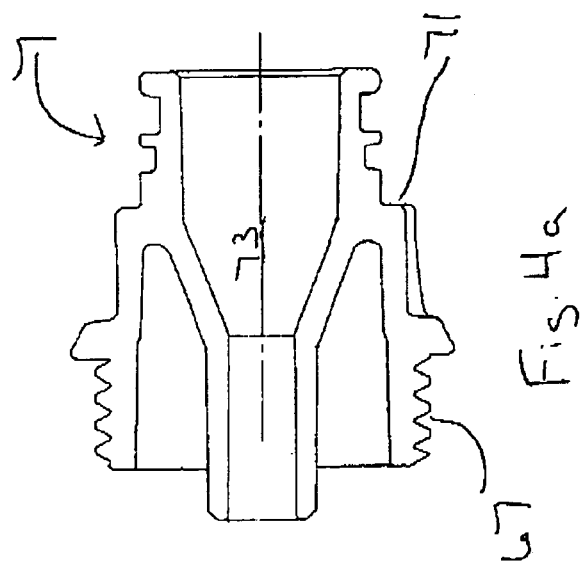
FIG. 4a is a side elevational cutaway view of the hose connector.

The aerator assembly 5 of the present invention is shown in FIGS. 3a-3f. The aerator assembly 5 includes the faucet connector 35. The faucet connector 35 has a top threaded end 37 which is threaded onto the receiving threads of a faucet (not shown). The faucet connector 35 is shown in more detail in FIGS. 5a and 5b. Specifically FIG. 5b shows the ledge 39 situated around the inside circumference 37 of the faucet connector 35. As can be seen, the ledge 39 has a raised portion, or "catch" 41. The faucet connector also includes an internal shoulder 43.

Water enters the aerator assembly 5 through a flow restrictor 45. The flow restrictor 45 contains a circular aperture 47 that permits the flow of water. The flow restrictor 45 is snap fit into the top end of the stream straightener 39. Additionally, the flow restrictor 45 is, in general, a circular disk upon which a seal washer 49 or perhaps an additional seal washer 51 may be seated. The seal washers 49, 51 are designed to create a watertight seal between the faucet and the faucet connector 35 and are compacted between the faucet and the faucet connector 35 when the faucet connector 35 is tightened onto the faucet.

Under the flow restrictor 45 and inside the stream straightener 39 is the aerator 53. The aerator 53 contains a plurality of apertures 55. The aerator 53 fits over the diverter disk 57, which in essence forms a ring around the aerator 53 and snaps into the stream straightener 39. The stream straightener 39 has a wide upper end 59 and a narrow lower end 61. The upper end 59 of the stream straightener 39 houses the diverter disc 57, the aerator 53 and the flow restrictor 45. This subassembly rests on the shoulder 63 formed within the stream straightener 39 by the narrowing of the lower end 61. The stream straightener 39 also contains a plurality of apertures 65, the purpose of which will be discussed in more detail later in this description. As installed, the upper portion of stream straightener 39 rests on the shoulder 43 of the faucet connector 35.

The hose connector 7 has a male threaded end 67 which threads into the female hose assembly 3. The opposite end of the hose connector 7 is insertable into the lower end of the faucet connector 35. The hose connector 7 generally contains a set of tabs 69 on the perimeter of the end. The tabs 69 on the hose connector 7 slide between the ledges 39 of the faucet connector 35. The hose connector 7 is then rotated such that the tabs 69 fit over the catch 41 and on the ledge 39 such that the hose connector 7 is secured on the ledge 39 of the faucet connector 35.

In normal faucet operation, water flows through the apertures 55 in the aerator 53. When the water flows through the aerator 53, air is drawn in through the apertures 65 in the stream straightener 39 an introduced into the water stream to create a soft, aerated stream of water. The inflow of air is drawn through the apertures 65 because of a vacuum (or Venturi) produced by water normal flow through the narrowed passages of the apertures 55 in the aerator 53. However, it is not advantageous to aerate water which will be directed, via a hose or a tube 25 as it interferes with the capacity of the tube 25 as well as interrupting continuous flow at the end of the tube 25. Therefore, when the tabs 69 of the hose connector 7 are locked into place on the faucet connector 5, the hose connector 7 cooperates with the faucet connector 5 to stop the inflow of air into the apertures 65 in the stream straightener 39. Ultimately an O-ring 71, which is installed to the hose connector 7 will seal and thus stop aeration of the water stream. Additionally, the hose connector 7 provides a passageway 73 for water, the water passageway 73 being narrowed to the general diameter of the tube 25.

Thus, the present invention provides for a new type of aerator that cooperates with a tube or hose attachment to stop the inflow of air into a water stream when the tube or hose is connected to the water faucet. This invention disclosure is to be considered in all respects to be illustrative and not restrictive, the scope of the invention being indicated by the appended claims rather than by the foregoing description, and all changes which come within the meaning and range of equivalency of the claims therefore are intended to be embraced therein.

What is claimed is:

1. An aerator sleeve attachment for a water providing faucet comprising;
   a faucet connector for directing the flow of water, said faucet connector having a lower end and an inner circumference, wherein the lower end of the faucet connector has at least one ledge around part of its inner circumference;
   an aerator secured within the faucet connector, the water being directed by the faucet connector therethrough; and
   a hose connector being securable to the faucet connector providing a sealing connection between the hose connector and the faucet connector such that air is not permitted to enter the aerator when the hose connector is secured to the faucet connector and the hose connector having a plurality of tabs, the tabs being insertable into the faucet connector and the hose connector being rotatable such that the tabs rest on the inside ledge of the faucet connector.

2. The aerator sleeve of claim 1 wherein the faucet connector has a male threaded end and the aerator sleeve attachment further provides for a hose having a female threaded end attachable to the hose connector.

3. The aerator sleeve attachment of claim 1 wherein a cylindrical stream straightener is provided and the aerator snaps into the stream straightener.

4. The aerator sleeve attachment of claim 1 wherein a flow restrictor is provided and the flow restrictor snaps into the stream straightener.

5. An aerator sleeve attachment for a water providing faucet comprising:
   a faucet connector connected to a faucet for directing the flow of water from the faucet, the faucet connector having at least one ledge around part of its inner circumference and an inner shoulder;
   a stream straightener having a generally cylindrical top and a generally cylindrical bottom, the bottom cylinder being of smaller diameter than the top cylinder; the top cylinder resting on the inner shoulder of the faucet connector;
   an aerator secured snap fit into the faucet connector; and
   a hose connector being securable to the faucet connector providing a sealing connection between the hose connector and the faucet connector such that air is not permitted to enter the aerator and the hose connector having a plurality of tabs, the tabs being insertable into the faucet connector and the hose connector being rotatable such that the tabs rest on the inside ledge of the faucet connector.

6. The aerator sleeve attachment of claim 5, the stream straightener having a plurality of apertures in its circumference for admitting the passage of air.

7. The aerator sleeve attachment of claim 5 wherein a flow restrictor is provided and the flow restrictor snaps into the stream straightener.

8. The aerator sleeve of claim 5 wherein the faucet connector has a male threaded end and the aerator sleeve attachment further provides for a hose having a female threaded end attachable to the hose connector.

* * * * *